United States Patent [19]
Peterson et al.

[11] Patent Number: 5,451,846
[45] Date of Patent: Sep. 19, 1995

[54] LOW CURRENT COMPENSATION CONTROL FOR THYRISTOR ARMATURE POWER SUPPLY

[75] Inventors: Robert S. Peterson; John W. Kane, Jr., both of Pittsburgh, Pa.

[73] Assignee: AEG Automation Systems Corporation, Oakdale, Pa.

[21] Appl. No.: 166,743

[22] Filed: Dec. 14, 1993

[51] Int. Cl.$^6$ .............................................. H02P 13/20
[52] U.S. Cl. .................................. 318/254; 388/812; 388/911; 363/128
[58] Field of Search .................. 318/432–434, 318/130, 439, 254; 388/809–815, 907.5, 921, 911; 363/65, 71, 95–98, 123, 125, 128, 131, 132

[56] References Cited

U.S. PATENT DOCUMENTS

| | | |
|---|---|---|
| 3,508,132 | 3/1970 | Peterson . |
| 3,950,684 | 4/1976 | Peterson . |
| 3,983,464 | 9/1976 | Peterson . |
| 4,028,601 | 6/1977 | Peterson . |
| 4,047,080 | 9/1977 | Peterson ................ 318/79 |
| 4,152,632 | 5/1979 | Peterson . |
| 4,186,437 | 1/1980 | Cuk ........................ 363/65 |
| 4,230,976 | 10/1980 | Müller ................... 318/254 |
| 4,423,362 | 12/1983 | Konrod .................. 318/139 |
| 4,532,459 | 7/1985 | Erdman et al. ........ 318/254 X |
| 4,683,411 | 7/1987 | Hamilton, Jr. et al. . |
| 4,685,040 | 8/1987 | Stergerwald et al. ... 363/98 |
| 4,805,081 | 2/1989 | Chambers et al. ..... 363/96 |
| 4,891,764 | 1/1990 | McIntosh ............... 318/432 X |
| 4,959,797 | 8/1990 | McIntosh ............... 318/432 X |
| 4,982,145 | 1/1991 | Peterson ................ 318/594 |
| 4,992,919 | 2/1991 | Lee et al. ............... 363/17 |

*Primary Examiner*—David S. Martin
*Attorney, Agent, or Firm*—Richard V. Westerhoff; Kirk D. Houser

[57] ABSTRACT

A control system for energizing a direct current (DC) motor with alternating current (AC) power includes a first voltage sensor for a peak voltage of AC power; a second voltage sensor for a counter electromotive force (EMF) of the motor; a current sensor for an armature current of the motor; a digital processor having a first current controller responding to sensed armature current and a current reference, a cooperating second current controller responding to sensed peak voltage, sensed counter EMF and the current reference signal, and a gating circuit responding to the controllers; and a thyristor converter circuit sequentially gating portions of half cycles of AC power to the motor in response to firing signals from the gating circuit. The controllers may control a gate angle of the firing signals, the control system may include a third voltage sensor for a terminal voltage of the motor, and the armature current may have discontinuous and continuous waveforms. The processor may calculate a start of continuous current value which is a function of a calculated peak voltage of the AC power and a calculated counter EMF of the motor. The calculated counter EMF is sensed when an absolute value of sensed armature current is less than the start of continuous current value but, otherwise, the calculated counter EMF is related to motor terminal voltage. The calculated peak voltage of AC power is an average of an absolute value of a peak positive sensed voltage and an absolute value of a peak negative voltage under calculated discontinuous current conditions but, otherwise, the calculated peak voltage is the average plus a calculated commutation notch line voltage loss. The calculated commutation notch line voltage loss may be a function of the gate angle, the sensed armature current and the calculated peak voltage. The gate angle may be a sum of gate angles from the two controllers.

20 Claims, 11 Drawing Sheets x = AC voltage sensor sampled

LOW CURRENT COMPENSATION CONTROL FOR THYRISTOR ARMATURE POWER SUPPLY

BACKGROUND OF THE INVENTION

1. Field of the Invention

This invention relates to a digitally implemented control system for controlling a direct current (DC) motor powered from an alternating current (AC) power source, and more particularly to such a control system having a low current compensation controller for controlling the motor under discontinuous armature current conditions.

2. Background of Information

A common type of control system for a DC motor utilizes a thyristor power module or converter to gate selected portions of half cycles of power from an AC source to an armature of the motor. Typically, a second thyristor power converter controls field current of the motor. Gate signals for the converters are generated by an analog or a digital control circuit.

Under low load conditions, in response to an increased gate angle, the converter phases back gating of voltage pulses to the armature. With this phase back, a point is reached where the current applied to the motor becomes discontinuous. As the effective gain of the converter decreases when the current is discontinuous, gain compensation is applied to a current controller. A common method of detecting discontinuous current monitors average current in the armature circuit. Whenever the average current drops below a predetermined minimum value, it is presumed that a discontinuous current condition exists and current controller gain compensation is applied. However, the average current and predetermined minimum value are not an accurate determinant of discontinuous current.

A typical example of a digital control system is provided by U.S. Pat. No. 5,321,343 entitled "Digital Motor Control System". In the control system, plural parallel digital control loops each control a selected motor parameter (e.g., armature current, motor speed, motor torque, etc.) in response to an associated parameter signal. Each loop applies a selected control action, such as derivative and proportional control, to the associated parameter signal to generate an associated intermediate control signal. One of the intermediate control signals is selected for application to a common digital integrator which, upon integrating the selected intermediate control signal, produces a resultant control signal having the integral of the selected control action. The control system also detects discontinuous current conditions and monitors voltages across switches of a thyristor power converter. A discontinuous current mode signal is generated when a voltage is simultaneously detected across all of the switches of the converter. The mode signal is reset, to indicate a continuous current mode, when the voltages across any two consecutively fired switches connected to the same DC bus in the converter drop below a threshold value.

As is well known in the art, the step response of a current controller under discontinuous current conditions is very slow in comparison with the step response for higher load currents where the current is continuous. At continuous armature currents, a small change in gate angle produces a large change in armature current. In digital control systems, non-linear gain compensation in the current controller improves low current step response. However, an increase in current controller gain at low current provides only partial compensation and leaves room for improvement.

There is a need, therefore, for low current compensation motor control which accurately compensates for nonlinearity in a converter at low load currents.

There is a further need for a low current compensation controller which operates in parallel with a conventional thyristor armature current controller.

SUMMARY OF THE INVENTION

These and other needs are satisfied by the invention which is directed to a digital control system having a low current compensation controller for controlling a motor under discontinuous armature current conditions. The low current compensation controller operates in parallel with a thyristor armature power supply current controller. The controllers generate a thyristor gate angle which is the sum of an output signal of the thyristor armature power supply current controller and an output signal of the low current compensation controller. The low current output signal changes when there is a change in motor counter electromotive force (EMF) or peak AC voltage to the converter. When the armature current is discontinuous, the low current output signal also changes when a current reference signal changes.

In particular, when the armature current is discontinuous, there is a greater required change in thyristor gate angle than when the armature current is continuous. However, at higher armature currents, under continuous current conditions, a small change in gate angle provides a large change in armature current. Because the low current output signal provides an accurate thyristor gate angle signal under discontinuous current conditions, the current controller output signal need not make relatively large changes to make corrections in armature current. Thus, the speed of response in controlling armature current is improved by the dual current controllers under discontinuous current conditions.

In one embodiment of the invention the low current controller provides a course thyristor gate angle setting as a function of three signals: (1) an armature current reference; (2) motor counter EMF; and (3) peak AC line voltage applied to the converter. In contrast to the low current controller gate angle output signal, the thyristor armature power supply current controller has an output signal that provides relatively fine gate angle changes. Both output signals are summed to provide the thyristor gate angle. A digital processor uses look-up tables in a memory of the processor to accurately calculate the low current gate angle, with minimal processor execution time, in order to provide critical dynamic performance.

In another embodiment of the invention, for application in drive systems where dynamic performance is less critical than the first embodiment, peak AC line voltage is an engineering tuning adjustment. In this second embodiment, improvements in processor execution time, and corresponding reductions in processor cost, are provided in exchange for some reduction in system performance in the event of variations in peak AC line voltage.

In either embodiment of the invention, armature circuit resistance is an engineering tuning adjustment. In the first embodiment, an armature circuit time constant is also a tuning adjustment.

It is a primary object of the present invention to provide an improved, low cost, digitally implemented system for controlling a DC motor energized from an AC power source.

It is a more particular object of the invention to provide such a control system with a low current compensation controller which accurately compensates for nonlinearity in a converter at low load currents.

It is yet a more particular object of the invention to utilize sensed peak voltage of AC power and sensed counter EMF of the motor in such accurate compensation control.

It is an even more particular object of the invention to provide such a low current controller that changes its gate angle output, when armature current is discontinuous, in response to changes in sensed peak voltage of AC power, sensed counter EMF of the motor or a current reference signal.

It is an additional object of the invention to provide a low current compensation controller which accurately calculates a value of current that corresponds to the start of continuous armature current.

It is a more particular object of the invention to provide such a low current controller which accurately calculates a value of peak voltage of AC power under continuous current conditions.

It is another more particular object of the invention to provide such a low current controller which accurately calculates a value of counter EMF of the motor under continuous current conditions.

It is yet another object of the invention to provide an efficient, economical low current controller that utilizes tuning parameters, for a peak voltage of AC power and start of continuous current in a smiled motor, along with sensed counter EMF of the motor.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
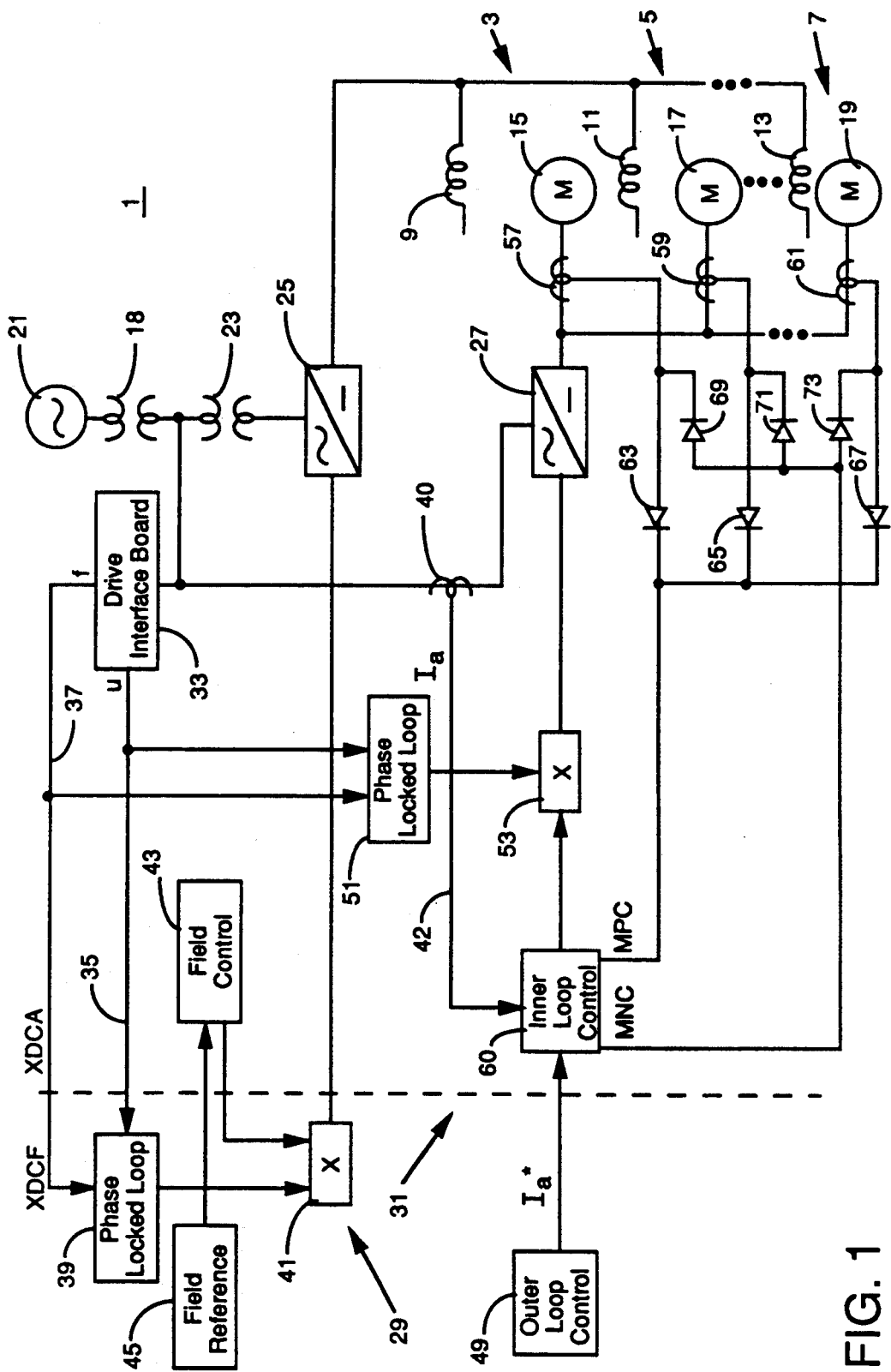
FIG. 1 is a block diagram of a motor control system in accordance with the invention.

The present invention is applicable to control systems for DC motors used in various applications. It is particularly useful for, and will be described in connection with a drive system for DC motors used in a rolling mill or other process line in the metals industry. In the exemplary embodiment of the invention set forth in detail, control system 1 of FIG. 1, which is also discussed in detail in controls operation of several DC motors 3,5,7 which are energized in parallel. Each of the motors 3,5,7 includes a field winding 9,11,13 and an armature winding 15,17,19, respectively. Both the field windings and the armatures are energized by an AC power source 21 through an isolation transformer 18. The AC power is applied through a second isolation transformer 23 to a field thyristor power converter 25 and directly to an armature thyristor power converter 27. The thyristor power converters 25,27, which are well known in the art, consist of an array of thyristors which are fired sequentially to generate pulsed DC power which is applied to the field windings and the armatures, respectively.

Firing of the thyristors in converter 25 is controlled by a field control circuit 29, while firing of the thyristors in converter 27 is controlled by an armature control circuit 31. Firing of the thyristors in both power converters 25,27 is synchronized to the line voltage produced by AC power source 21. As the line voltage has considerable noise, including commutation notches produced by the thyristors in the converters, a Drive Interface Board (DIB) 33 generates a digital unfiltered line voltage signal, u, on lead 35 and a filtered line voltage signal, f, on lead 37 for use by the converters in synchronizing the firing pulses for the respective converters to the line voltage.

In the field control circuit 29, a digital phase lock loop (PLL) 39 operates to initially determine the phase shift due to filtering between the filtered and unfiltered line voltage signals, which is typically about 90°. The phase lock loop then uses the calculated phase shift together with the filtered line voltage signal to provide a gate reference signal to gating circuit 41.

A field control module 43 regulates either field voltage or field current, according to the application, to a reference supplied by a field reference module 45 by generating a control signal which is used by gating circuit 41 to determine the phase angle for firing the thyristors in converter 25.

The armature control circuit 31 includes an inner control loop regulated by an inner loop control module 60 and an outer control loop regulated by an outer loop control module 49. The armature control circuit also includes a PLL 51 which supplies a gate reference signal to a gating circuit 53 for converter 27 in a manner similar to that described above for PLL 39.

The inner loop control 60 incorporates multiple control loops which can provide current control or voltage control for the motor armatures, and forward and reverse current protection for the individual motors. The inner loop control 60 receives a signal, $I_a$, on lead 42 representative of average AC armature current from a current sensor 40. Current transformers 57,59,61 monitor the individual armature currents. The inner loop control 60 also receives a signal, $I_a^*$, representative of an average armature current reference from outer loop control 49. Diodes 63,65,67 provide a signal, MPC, representing the largest positive (forward) current in any of the motors to inner loop control 60 and reverse connected diodes 69,71,73 provide a most negative (reverse) current signal, MNC.

The outer loop control 49 regulates selected other system parameters, such as motor speed or torque, to a reference value.

The digital control system of the invention is implemented with transputers. The transputer is a simplified digital processor with a limited number of registers and a minimum set of instructions which is typically used for parallel processing operations. Three transputers are used in the exemplary system, two of which implement the functions illustrated in FIG. 1. The first transputer XDCA implements field control module 43, inner loop control module 60, PLL 51 and gating circuit 53. The field reference 45, outer loop control module 49, PLL 39 and gating circuit 41 are implemented by the second transputer XDCF.

Figure 1A:
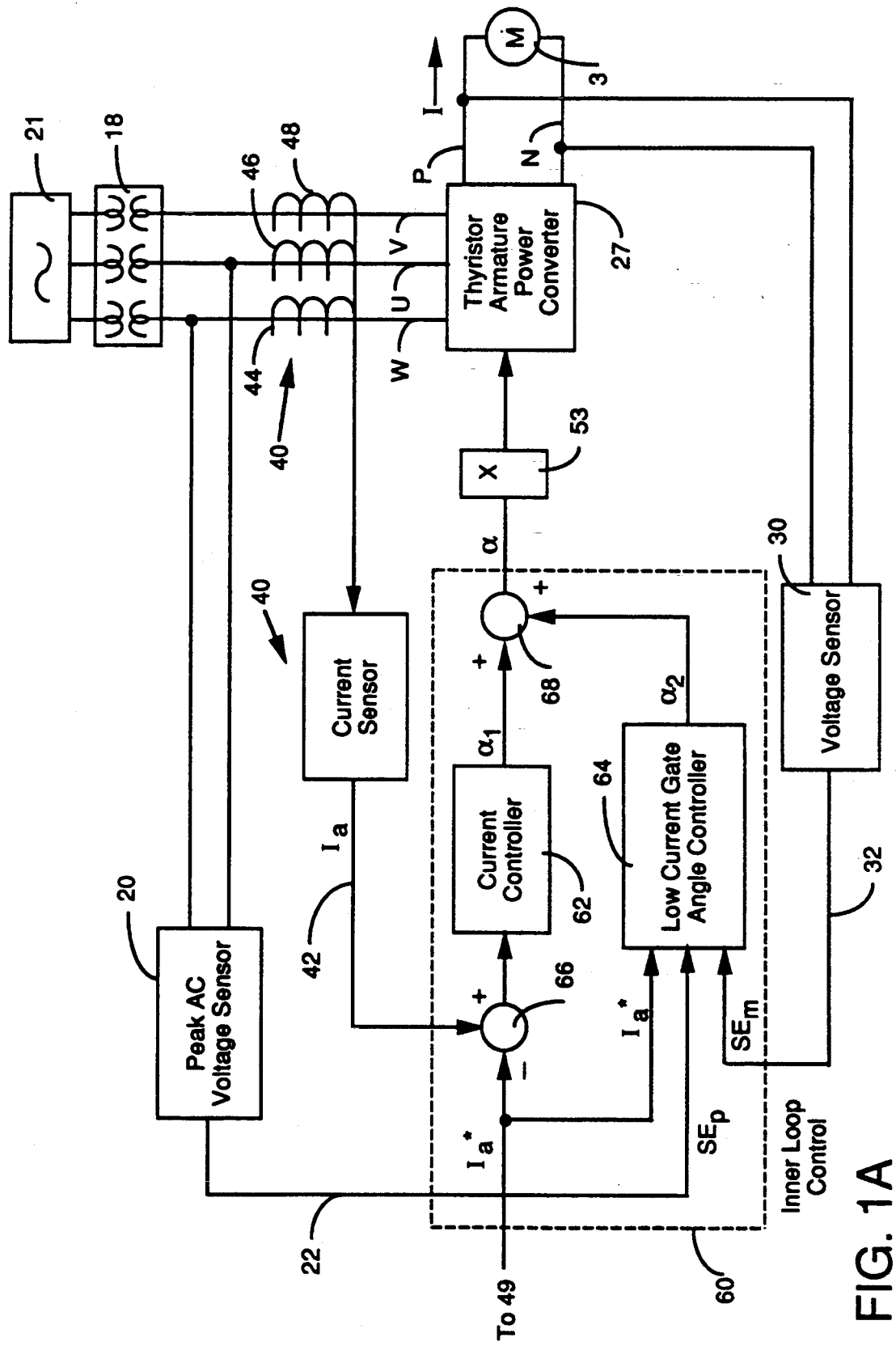
FIG. 1A is a functional diagram of the inner loop control details of FIG. 1 in accordance with one embodiment of the invention.

Referring now to FIG. 1A, a functional diagram of one embodiment of the invention is illustrated. Inner loop control 60 includes current controller 62, low current, open-loop, gate angle controller 64, error generator 66 and summer 68. The low current controller 64 provides a course thyristor gate angle setting $\alpha_2$ as a function of the average armature current reference $I_a^*$ (per-unit) output by outer loop control 49 (see FIG. 1), a sensed motor counter EMF $SE_m$ (per-unit) output by voltage sensor 30, and a sensed peak AC line voltage $SE_p$ (per-unit) output by peak AC voltage sensor 20. For simplicity of illustration, only one motor 3 is shown, it being understood that the invention is applicable to multiple parallel motors. DC power lines P,N source a motor armature current I to motor 3. The power lines P,N are sensed by voltage sensor 30 which produces the sensed motor counter EMF voltage $SE_m$ on lead 32. Current sensor 40 includes three current transformers 44,46,48 on AC power lines W,U,V, respectively, and produces the signal $I_a$ (per-unit), on lead 42, representative of armature current I.

Figure 2:
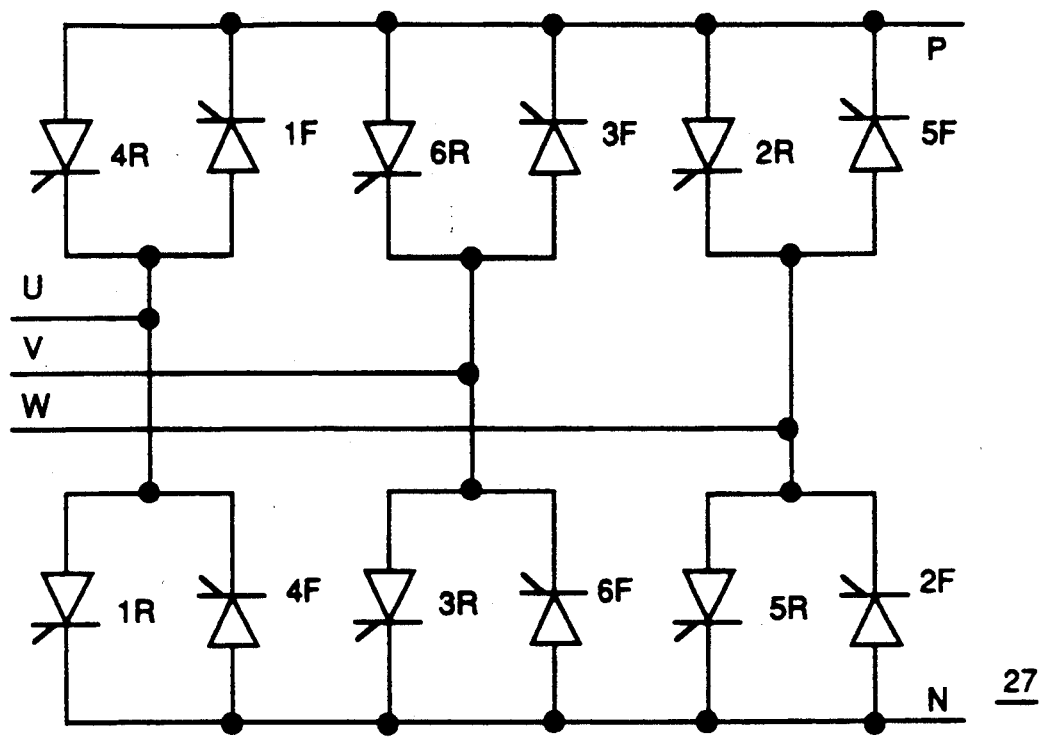
FIG. 2 is a schematic diagram, illustrating details of the armature power converter of FIG. 1, of a 6-pulse forward/reverse converter having three phase AC input power lines and DC output power lines.
Figure 2A:
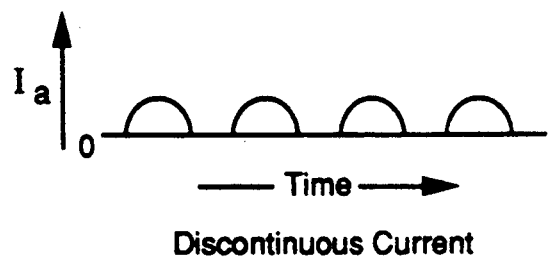
FIG. 2A illustrates discontinuous three phase armature current in a motor of FIG. 1 with respect to time.
Figure 2B:
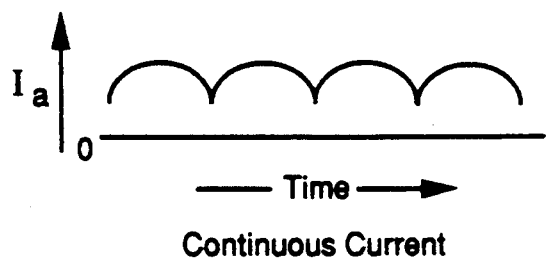
FIG. 2B illustrates continuous three phase armature current in a motor of FIG. 1 with respect to time.
Figure 2C:
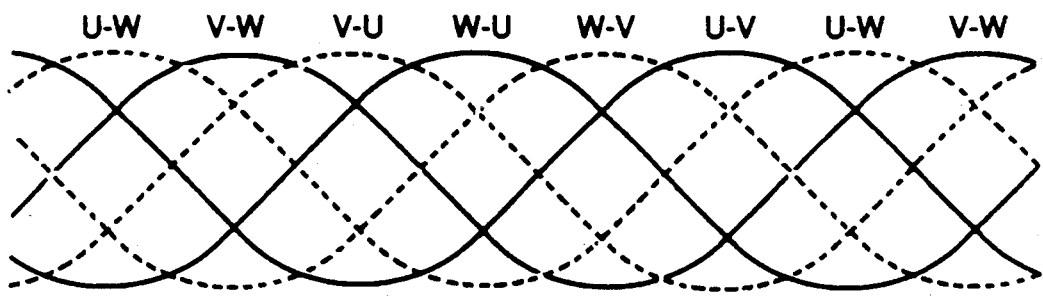
FIG. 2C illustrates six inter-phase AC line voltage relationships in the converter of FIG. 2 with respect to time.
Figure 2D:
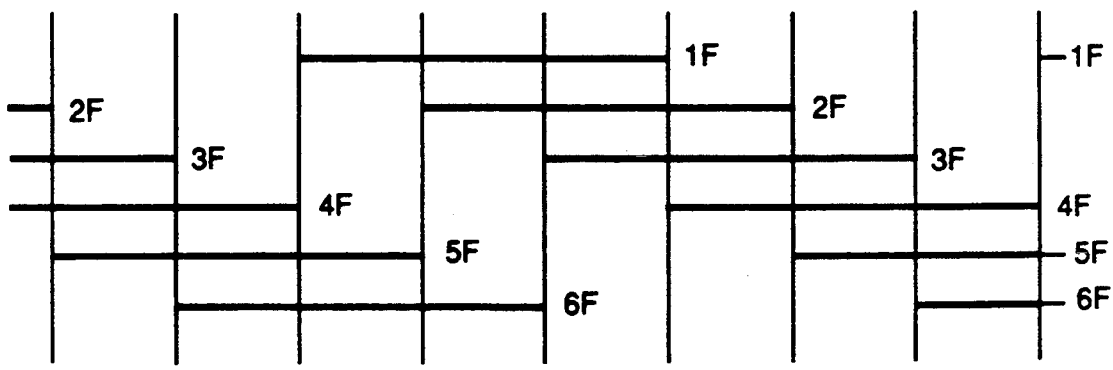
FIG. 2D illustrates a full range of thyristor gating in the converter of FIG. 2 with respect to time.
Figure 2E:
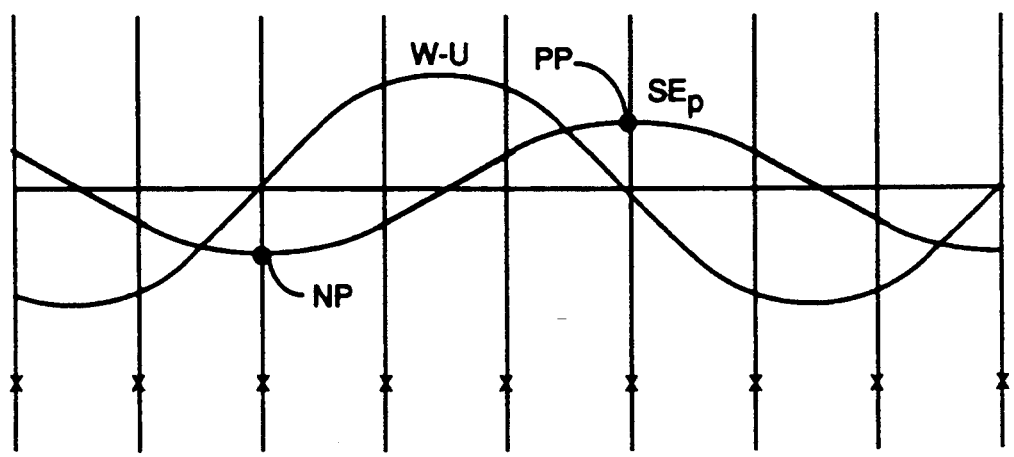
FIG. 2E illustrates one inter-phase AC line voltage of FIG. 2C, an output of the AC voltage sensor of FIG. 1A and sampling times for the sensed AC voltage.

As shown in FIGS. 1A and 2E, inter-phase AC line voltage W-U from AC voltage source 21 is sensed by peak AC voltage sensor 20. The sensed peak AC line voltage $SE_p$, on lead 22, is utilized by low current controller 64. Error generator 66 calculates a difference between the sensed three phase average armature current $I_a$ and the average armature current reference $I_a^*$. Current controller 62 utilizes the difference to produce a vernier gate angle $\alpha_1$. Summer 68 sums gate angles $\alpha_1$ and $\alpha_2$ and provides a total thyristor gate angle $\alpha$ to gating circuit 53 for converter 27.

Referring now to FIG. 2, converter 27 is a conventional 6-pulse forward/reverse thyristor armature power supply for controlling operation of the motors in forward and reverse directions. It being understood that the invention is applicable to other converters such as a 12-pulse thyristor armature power supply consisting of two 6-pulse supplies phase shifted 30° from each other. FIG. 2 illustrates the positive (forward) and negative (reverse) banks of converter 27 having three phase AC input power lines U,V,W and DC output power lines P,N. Each bank of the converter includes three pairs of thyristors 1F-4F,3F-6F,5F-2F or 4R-1R,6R-3R,2R-5R connected in series between the positive DC bus P and the negative DC bus N. The three phases U,V,W of three phase power supplied by AC power source 21 are connected to the midpoints of the respective thyristor pairs. As illustrated in FIG. 2C, six inter-phase voltages U-W,V-W,V-U,W-U,W-V,U-V, that are each separated by 60° ($\pi/3$ radians), are available in converter 27.

As illustrated in FIG. 2D, the forward thyristors of converter 27 are fired in the sequence 1F-6F by firing pulses generated by gating circuit 53. FIG. 2D illustrates a full 180° range of thyristor gating in which the gate angle $\alpha$ is 0°. At least one of the thyristors connected to the positive bus P and one connected to the negative bus N are turned on to gate rectified pulses of AC power to motor armatures connected to busses P,N. The gating circuit 53 controls the phase of the AC source voltage at which the respective thyristors are turned on and, therefore, the portion of each half-cycle pulse of AC voltage which is rectified and gated to the armatures of the DC motors. For instance, increasing the firing angle delays the point in the AC waveform at which the thyristors are gated and, hence, a smaller portion of each AC half-cycle is applied to the motor. Operation of the negative bank of thyristors 1R-6R is similar, except that the polarity of all the thyristors is reversed for controlling the current to the motor in a reverse direction.

Each of the thyristors is turned on by the application of a gating pulse while the thyristor is forward biased. The thyristors remain conducting until they are turned off in one of two ways. First, a thyristor is turned off when the voltage across the thyristor passes through zero forcing the thyristor current to zero. A second way in which a thyristor can be turned off is when another thyristor connected to the same bus is turned on and applies a higher voltage to the common bus which reverse biases the first thyristor. When a thyristor is turned off under the first condition, it is said to be line commutated. When it is turned off in the second manner, it is said to be thyristor commutated.

When a thyristor is commutated off by the firing of the next thyristor connected to the same bus, in order that current is continuously being supplied to the DC busses, the converter is said to be operating in a continuous current mode. This occurs at smaller firing angles when there is a shorter delay after the zero crossing of the AC voltage, before the firing pulse is delivered. In this manner, a thyristor is turned on before the preceding thyristor connected to the same bus is turned off. On the other hand, where a thyristor is commutated off by the line voltage because the voltage across the thyristor has passed through zero before the next thyristor connected to the same bus is turned on, the DC current is interrupted until the next thyristor is turned on. This occurs when the firing angle is relatively large, or phased back, in order that there is a long delay after the zero crossing before the thyristor is turned on. This is referred to as a discontinuous current mode of the converter because current is intermittently supplied to the DC busses.

Referring to FIGS. 1A and 2A–2B, a maximum armature current peak to peak ripple occurs at a start of continuous current (see FIG. 2B which generally illustrates continuous current). When the gate angle $\alpha$ is set to a continuous current gate angle $\alpha_c$, an integral of the difference between the AC voltage at converter 27 and motor counter EMF over a 60° time period starting at the initial gating of a thyristor to the gating of the next thyristor equals zero volt-seconds. An equation for the start of continuous armature current gate angle $\alpha_c$ is:

$$\alpha_c(\text{radians}) = \cos^{-1}[(\pi/3) \times (E_m/E_p)]; \qquad \text{Eq. (1)}$$

where:

$E_m$ is motor counter EMF, and
$E_p$ is peak AC line voltage to converter 27.

When armature current $I_a$ is on the verge of increasing from zero amperes, the gate angle $\alpha$ is equal to a start of discontinuous current gate angle $\alpha_d$. A gate angle $\alpha$ greater than the start of discontinuous current gate angle $\alpha_d$ results in zero current. An equation for the start of discontinuous current gate angle $\alpha_d$ is:

$$\alpha_d(\text{radians}) = (2\pi/3) - \sin^{-1}[E_m/E_p]. \qquad \text{Eq. (2)}$$

A gate angle between $\alpha_c$ and $\alpha_d$ produces discontinuous current. A gate angle equal to $\alpha_c$ produces a maximum peak to peak ripple in armature current, which is on the verge of continuous current. A gate angle less than $\alpha_c$ produces continuous current. In this region of operation, where $\alpha$ is less than $\alpha_c$, a small change in gate angle $\alpha$ produces a large change in armature current. In contrast, when the gate angle produces discontinuous current, where $\alpha$ is greater than $\alpha_c$, the low current controller 64 operates to control armature current and compensate for the fact that a relatively large change in gate angle $\alpha$ is required to cause a change in armature current.

Figure 3:
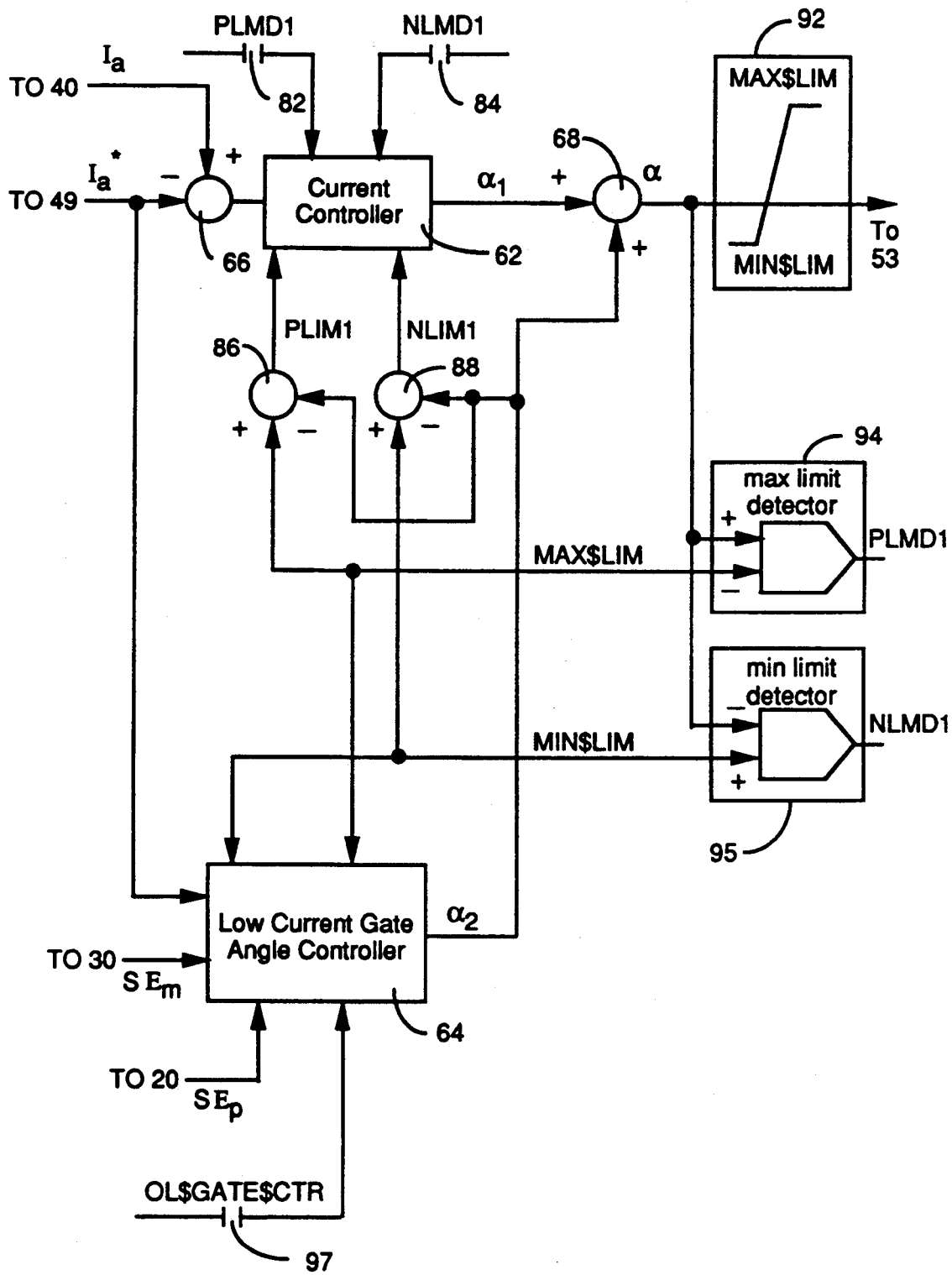
FIG. 3 is a block diagram of the inner loop control details of FIG. 1 in accordance with the invention.

FIG. 3 illustrates operation of current controller 62 and low current controller 64 in accordance with the invention. Minimum limit MIN$LIM and maximum limit MAX$LIM are applied to gate angle $\alpha$ by limiter 92 before the gate angle is output to gating circuit 53. These limit signals are also provided to low current controller 64 in order that $\alpha_2$ is produced within the assigned limits. In the exemplary embodiment, the minimum limit is a rectifying end stop set to 10° and the maximum limit is a calculated inverting end stop which generally does not exceed 170°. Limit detectors 94,95 compare the gate angle $\alpha$ produced by summer 68 with the limits MAX$LIM,MIN$LIM and produce signals PLMD1,NLMD1 that indicate whether the gate angle is greater than or equal to the maximum limit, or less than or equal to the minimum limit, respectively. Software contacts 82,84 provide the signals PLMD1,NLMD1 to an integral controller of current controller 62 in order that integration is held whenever the gate angle is outside of the maximum or minimum limit.

The signal OL$GATE$CTR is a preassigned logic constant that is stored in a memory of processor XDCA. Whenever OL$GATE$CTR is active, low current controller 64 is enabled by a software contact 97. On the other hand, when logic signal OL$GATE$CTR is inactive, low current controller 64 is disabled by software contact 97 and gate angle $\alpha_2$ is set to zero. The low current gate angle $\alpha_2$ is inverted for use by summers 86,88 which produce limit signals PLIM1,NLIM1 for current controller 62. The positive limit PLIM1, an inverting end stop for the current controller, is equal to MAX$LIM less $\alpha_2$. Similarly, the negative limit NLIM1, a rectifying end stop for the current controller, is equal to MIN$LIM less $\alpha_2$. In this manner, current controller 62 limits $\alpha_1$ such that $\alpha$ is within the limits MAX$LIM and MIN$LIM.

Figure 4:
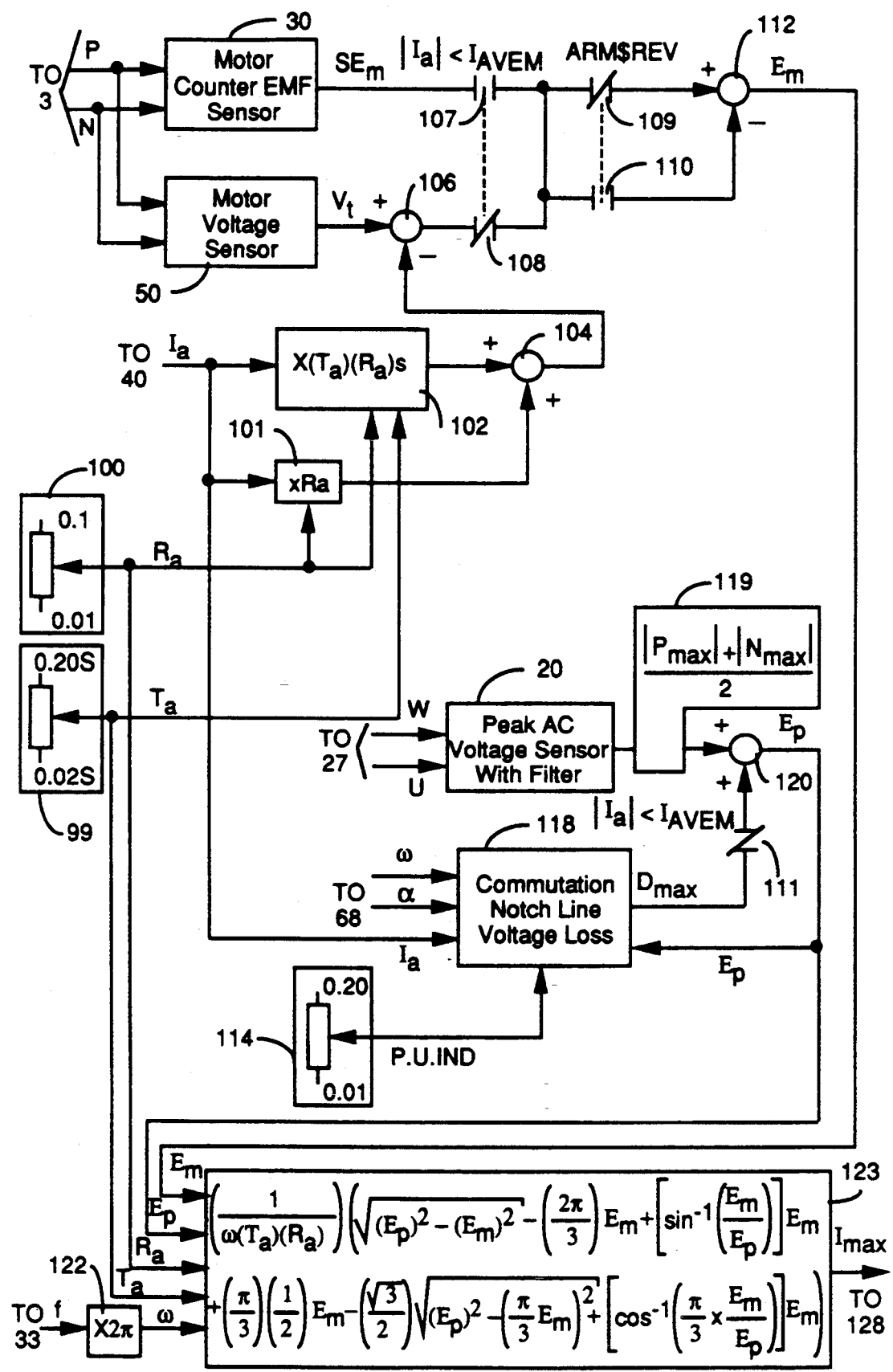
FIG. 4 is a functional diagram, in accordance with the embodiment of FIG. 1A, illustrating the generation of a peak armature current ripple signal, representative of the start of continuous current, as a function of calculated motor counter EMF and calculated peak AC line voltage.

FIG. 4, in accordance with the embodiment of FIG. 1A, illustrates software modules for calculating a maximum peak ripple current $I_{max}$, which occurs at the start of continuous current, as a general function of motor counter EMF $E_m$ and peak AC line voltage $E_p$. An equation for the maximum peak ripple current $I_{max}$, which occurs when the gate angle $\alpha$ equals $\alpha_c$, is:

$$I_{max}(\text{per-unit}) = \left(\frac{1}{\omega(T_a)(R_a)}\right)\left(\sqrt{[(E_p)^2 - (E_m)^2]} - \frac{2\pi}{3}E_m + \left(\sin^{-1}\frac{E_m}{E_p}\right)E_m + \left(\frac{\pi}{3}\right)\left(\frac{1}{2}\right)E_m - \left(\frac{\sqrt{3}}{2}\right)\sqrt{\left[(E_p)^2 - \left(\frac{\pi}{3}E_m\right)^2\right]} + \left\{\cos^{-1}\left[\left(\frac{\pi}{3}\right)\left(\frac{E_m}{E_p}\right)\right]\right\}E_m\right) \qquad \text{Eq. (3)}$$

where:

$\omega$ (radians per second) is $2\pi f$,
(Hertz) is a frequency of AC power 21,
$R_a$ (per-unit) is a resistance of motor armature 15, and
$T_a$ (seconds) is a time constant of motor armature 15.

The per-unit armature resistance $R_a$ and armature time constant $T_a$ are determined by measurement and calculation. Per-unit armature resistance is calculated from the equation:

$$R_a(\text{per-unit}) = VR1/V_r; \qquad \text{Eq. (4)}$$

where:

$V_r$ (volts) is rated armature voltage of motor 3, and
VR1 (volts) is an output voltage of converter 27 when rated armature current is circulated through motor 3 which has a zero ampere field excitation current (i.e., a stall condition).

The armature time constant $T_a$ is determined by circulating current through a stalled motor. The current is adjusted to a value $I_m$, which is equal to the start of continuous current measured per unit of rated DC motor current. Equations for the time constant $T_a$, are:

$$T_a(\text{seconds}) = (1 - \sqrt{3}/2) \times E_p/(\omega \times R_a \times I_m); \text{ or} \qquad \text{Eq. (5)}$$

$$T_a(\text{seconds}) = 0.13398 E_p/(\omega \times R_a \times I_m). \qquad \text{Eq. (5a)}$$

When the gate angle $\alpha$ equals $\alpha_c$, average armature current $I_{AVEM}$ is well known as a function of $I_{max}$:

$$I_{AVEM}(\text{per-unit}) = (2/3) \times I_{max}. \qquad \text{Eq. (6)}$$

When the average armature current reference $I_a^*$ is greater than $I_{AVEM}$, a course gate angle $\alpha_2$ is set equal to $\alpha_c$, which is the gate angle for the start of continuous armature current. When the reference $I_a^*$ is less than $I_{AVEM}$, the course gate angle $\alpha_2$ is calculated to produce an armature current equal to the current reference. Equations for the gate angle $\alpha_2$ are:

$$\alpha_2 \text{ (radians)} = (1 - K) \times \alpha_d + (K) \times \alpha_c; \text{ and} \qquad \text{Eq. (7)}$$

$$K = \sqrt[3]{[(|I_a^*|)/(I_{AVEM})]}; \qquad \text{Eq. (7a)}$$

where:
$|I_a^*| \leq I_{AVEM}$, and
$K \leq 1$.

Still referring to FIG. 4, module 123 implements equation 3. In the exemplary embodiment, tuning adjustment 99 provides a preassigned value for $T_a$ between 0.02 seconds and 0.20 seconds. Similarly, tuning adjustment 100 provides a preassigned value for $R_a$ between 0.01 and 0.1. A frequency f, representative of the filtered line voltage signal, f, from DIB 33, is multiplied by $2\pi$ by module 122 to generate the signal $\omega$ (radians per second). Values for $T_a$ and $R_a$ are determined, as previously discussed, to match the motor armature characteristics.

Motor counter EMF $E_m$ is measured when motor armature current is discontinuous and is calculated when the armature current is continuous. When the armature current is zero amperes, motor counter EMF $E_m$ is equal to motor terminal voltage $V_t$. Motor counter EMF sensor 30 is connected to DC voltage inputs P,N of motor 3 in order to read a terminal voltage of the motor. Sensor 30 reads the voltage just prior to gating. A sample and hold circuit (not shown) in sensor 30 retains the analog reading until it is read by processor XDCA. The motor terminal voltage is read by processor XDCA, in response to a processor interrupt that occurs 30° after thyristor gating, for use in low current controller 64 (see step 206 of FIG. 6).

Whenever the absolute value of armature current $I_a$ is less than $I_{AVEM}$, software contact 107 passes sensed motor counter EMF $SE_m$ by either software contact 109 or 110 to summer 112. Whenever the forward thyristor banks are gated, software contact 109 is active and $E_m$ equals $SE_m$. Otherwise, when the reverse banks are gated, software contact 110 is active and $E_m$ equals $-SE_m$.

On the other hand, when armature current $I_a$ is continuous, software contact 107 is inactive, software contact 108 is active, and motor counter EMF $E_m$ is calculated from the following equation:

$$E_m(\text{per-unit}) = V_t - (I_a \times R_a) - (T_a \times R_a) \times (dI_a/dt); \qquad \text{Eq. (8)}$$

where:
$V_t$ (per-unit) is obtained from motor voltage sensor 50,
$dI_a$ is the difference between the present and previous values of armature current $I_a$, and
dt is the time between successive low current controller calculations (e.g., 2.777 mS in a 60 Hz system).
Equation 8 is implemented by modules 101, 102, 104 and 106 of FIG. 4. Module 101 determines the product $I_a \times R_a$. Module 102 calculates the function $I_a \times (T_a \times R_a)s$, where s is the Laplace operator (1/second). Summers 104 and 106 complete the calculation of equation 8. Software contacts 109, 110 and summer 112 operate in the same manner discussed previously for discontinuous current to generate the calculated value of $E_m$.

The low current controller 64 also utilizes a value of peak AC line-to-line voltage $E_p$ which is applied to converter 27. AC voltage sensor 20 includes filtering to eliminate noise which typically occurs on three phase power lines W,U,V. In the exemplary embodiment, at an AC power frequency of 60 Hz, a high order filter having four 2 mS filters is utilized to provide a 90° phase shift. As shown in FIG. 2E, the filtering phase shifts line-to-line voltage W-U by approximately 90° in order that the sensed zero crossing occurs at the peak of the W-U waveform. Different methods of measuring and calculating the peak voltage $E_p$ are used in the event armature current is discontinuous or continuous. When the armature current is discontinuous, there is generally no notching in the AC line voltage at converter 27. However, when the armature current is continuous, commutation voltage notches are generally present in the AC line voltage and the effect of average AC line voltage loss because of AC line voltage notching must be considered.

Under continuous current conditions, as is well known in the art, there are six voltage notches per cycle. In two of the notches, the line voltage goes to zero. The width $\mu$ of the two commutation notches may accurately be determined from one of the two following equations:

$$\mu(\text{radians}) = \cos^{-1}[\cos(\alpha) - \{(2 \times X_c)/(\sqrt{2} \times E_{11})\} \times I_d] - \alpha; \qquad \text{Eq. (9)}$$

where:
$X_c$ (ohms per phase) is commutation AC reactance of AC power source 21 and isolation transformer 18,
$E_{11}$ (volts) is AC line-to-line RMS voltage at converter 27, and
$I_d$ (amperes) is DC load current of converter 27; or $$\mu(\text{radians}) = \cos^{-1}[\cos(\alpha) - (P.U.IND) \times (P.U.I.)] - \alpha; \qquad \text{Eq. (9a)}$$

where:
P.U.IND is commutation AC inductive impedance per unit of base impedance of AC power isolation transformer 18; P.U.I. is $I_a$ (per-unit), provided by sensor 40, which is presumed equal to DC load current per unit of rated DC load current of converter 27.

In the exemplary embodiment, in order to reduce processor execution time, the commutation overlap angle $\mu$ may be approximated by the following three equations:

$$\mu(\text{radians}) = TU2 \times \omega;$$

$$TU2(\text{seconds}) = \{\sin[E + \sin[\alpha + (TU1) \times \omega]\} \times (TU1)/2; \text{ and} \qquad \text{Eq. (9c)}$$

$$TU1(\text{seconds}) = (P.U.IND) \times (P.U.I.)/(\omega \times \sin[\alpha]). \qquad \text{Eq. (9d)}$$

Equation 9d is a first approximation of a commutation overlap time, equation 9c is a second approximation of the commutation overlap time and equation 9b provides the commutation overlap angle $\mu$. These equations use only a sine function which is obtained by processor XDCA using look-up tables in processor memory.

Referring again to the embodiment of FIG. 4, AC voltage sensor 20 phase shifts both the AC line voltage envelope and the fundamental frequency of the voltage notch waveform, which is identical to the AC line voltage frequency. Since sensor 20 has a high order filter, higher order notch waveform harmonics may be neglected. Equations which may be used to represent the notch voltage sine waveform envelope are as follows:

$$D_{max}(\text{per-unit}) = (E_p) \times (\text{P.U.IND}) \times (\text{P.U.I.}) \times \sin[\pi-\alpha-\mu/4]; \quad \text{Eq. (10)}$$

where $\alpha < \pi/2$; and $$D_{max}(\text{per-unit}) = (E_p) \times (\text{P.U.IND}) \times (\text{P.U.I.}) \times \sin[\pi-\alpha-3\,\mu/4]; \quad \text{Eq. (10a)}$$

where $\alpha \geq \pi/2$.

Thus, under continuous current conditions, an equation for calculating the peak AC line voltage $E_p$ is as follows:

$$E_p(\text{per-unit}) = \{(|P_{max}|) + (|N_{max}|)\}/2 + D_{max}; \quad \text{Eq. (11)}$$

where:

$P_{max}$ (per-unit) is the peak of the positive measured voltage after filtering adjusted for amplitude reduction by the filter of sensor 20, and $N_{max}$ (per-unit) is the peak of the negative measured voltage after filtering adjusted for amplitude reduction by the filter of sensor 20.

In the exemplary embodiment, $P_{max}$ and $N_{max}$ are divided by 0.95 to adjust for filter attenuation. In general, equations 10–10a closely approximate (within 1%) the notch voltage when the thyristor gate angle 60 is limited between 10° and 150°.

Referring to FIGS. 2C–2E, in the exemplary embodiment, AC line voltage W-U is applied to peak AC voltage sensor 20 and is filtered as previously discussed. As shown in FIG. 2E, the output signal $SE_p$ of the sensor is sampled every time one of the six AC line voltage combinations U-W,V-W,V-U,W-U,W-V,U-V pass through zero voltage. Both the positive peak voltage PP and the negative peak voltage NP occur when one of the voltage combinations passes through zero voltage. When the voltage $SE_p$ is positive, the maximum positive voltage $P_{max}$ is selected for a minimum of three consecutive voltage samplings. In a like manner, when the voltage $SE_p$ is negative, the maximum negative voltage $N_{max}$ is selected for a minimum of three consecutive voltage samplings. In both cases, as previously discussed, voltage reduction because of filtering is taken into consideration.

Under discontinuous current conditions, an equation for calculating the peak AC line voltage $E_p$ is as follows:

$$E_p(\text{per unit}) = \{(|P_{max}|) + (|N_{max}|)\}/2. \quad \text{Eq. (11a)}$$

Referring again to FIG. 4, modules 111,114,118,119 and 120 implement equations 9b–9d, 10–10a and 11–11a. In particular, tuning adjustment 114 provides a preassigned value for P.U.IND (per-unit) between 0.01 and 0.20. Module 118 calculates $\mu$, using equations 9b–9d, and $D_{max}$, using equations 10–10a, as a function of P.U.IND, $I_a$(P.U.I.), gate angle $\alpha$, calculated peak voltage $E_p$, $\omega$ and $\mu$. In the exemplary embodiment, a look-up table in XDCA memory is used to solve the sine function of equations 9c–9d and 10–10a. Module 119 calculates equation 11a and applies the result to summer 120 which generates the calculated peak voltage $E_p$. Whenever armature current is not discontinuous, software contact 111 applies $D_{max}$ to summer 120 to implement equation 11.

Figure 4A:
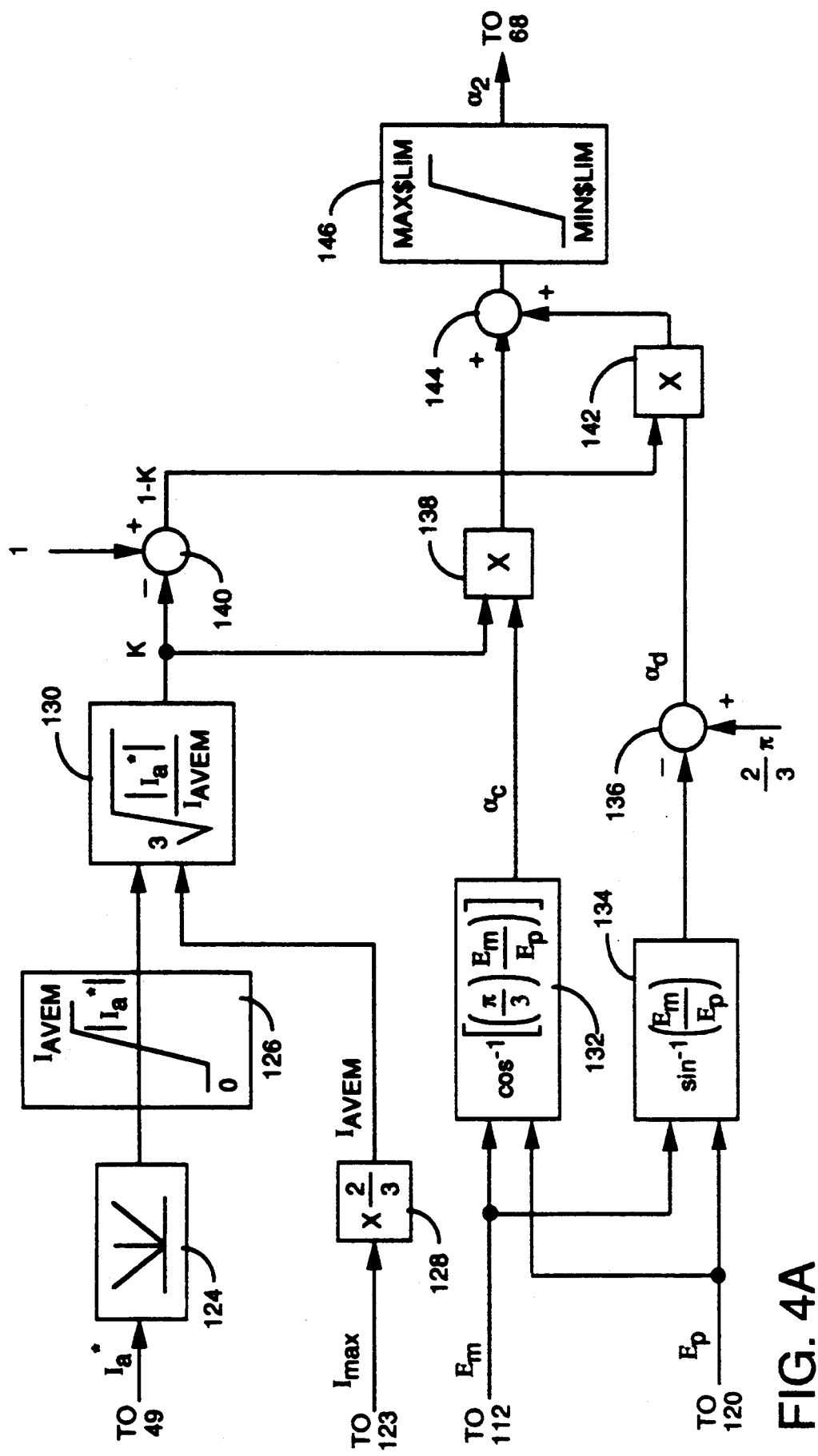
FIG. 4A is a block diagram of low current compensation thyristor gate angle control, in accordance with the embodiment of FIG. 1A, utilizing the peak current ripple signal of FIG. 4.

FIG. 4A illustrates software modules for calculating the low current gate angle $\alpha_2$ as a function of the average armature current reference $I_a^*$, the maximum peak tipple current $I_{max}$, which occurs when gate angle $\alpha$ equals $\alpha_c$, the calculated motor counter EMF $E_m$ and the calculated peak AC line voltage $E_p$. In particular, an absolute value of the armature current reference $I_a^*$ is determined by module 124. The absolute value of $I_a^*$ is limited between 0 and $I_{AVEM}$ by module 126 in order that the calculated value of K is less than or equal to one. Module 132 implements equation 1 and calculates $\alpha_c$ from $E_m$ and $E_p$. Modules 134 and 136 solve equation 2 and determine $\alpha_d$ from $E_m$ and $E_p$. Module 128 implements equation 6 and calculates $I_{AVEM}$ from $I_{max}$. Module 130 solves equation 7a and determines K from the limited absolute value of $I_a^*$ and $I_{AVEM}$. Finally, modules 138,140,142 and 144 implement equation 7 and calculate $\alpha_2$ from K, $\alpha_c$ and $\alpha_d$. Limiter 146 limits the value of $\alpha_2$ between MIN$LIM and MAX$LIM as previously discussed with FIG. 3. Modules 130,132 and 134, in the exemplary embodiment, use look-up tables in processor memory in the solution of equations 7a, 1 and 2, respectively.

Figure 5:
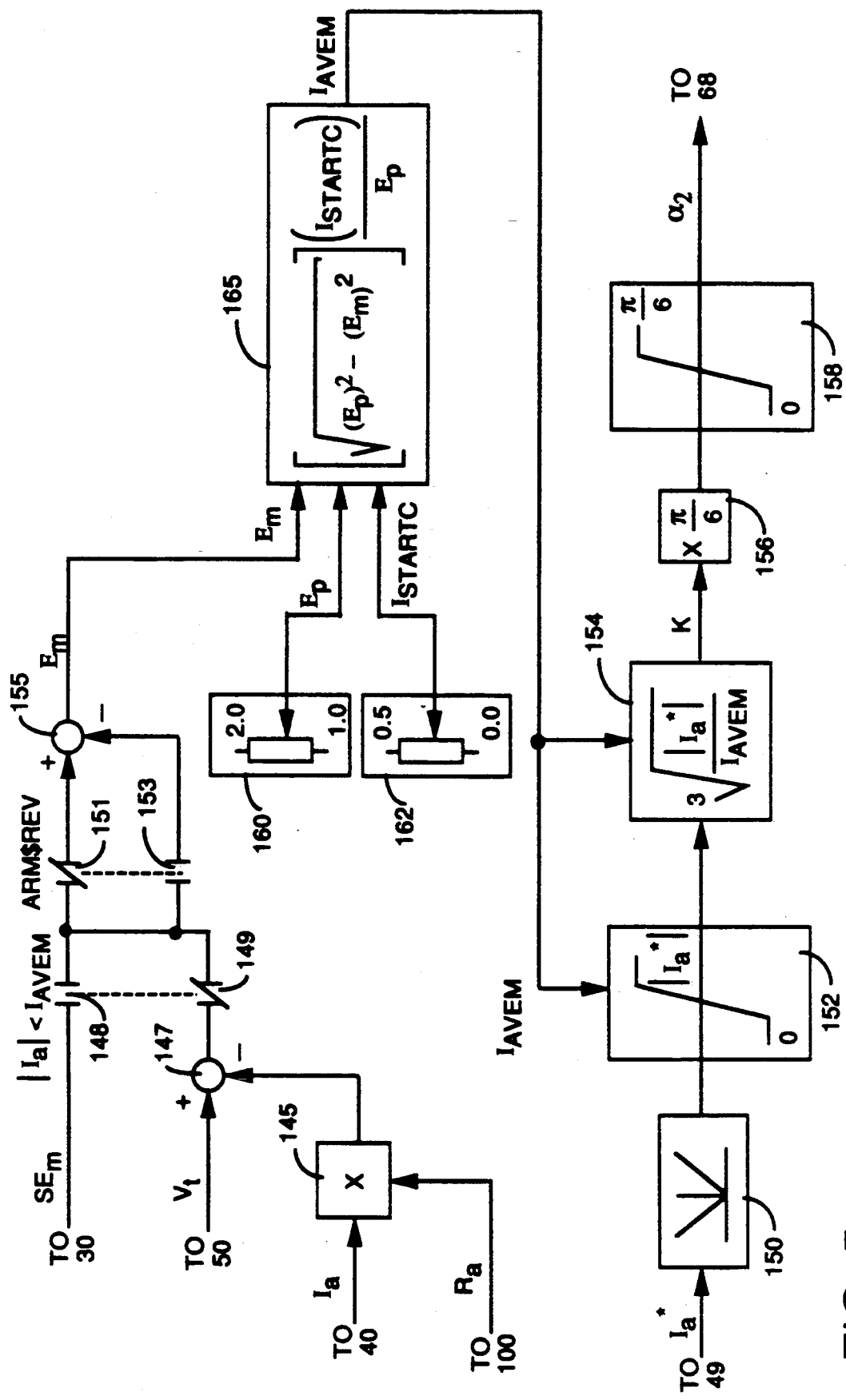
FIG. 5 is a block diagram of the low current gate angle controller of FIG. 3 in accordance with another embodiment of the invention.

Referring now to FIG. 5, another embodiment of the invention is illustrated for application in drive control systems where dynamic performance is less critical. Unlike the embodiment of FIGS. 1A and 4–4A, peak AC line voltage $E_p$ is not monitored. Instead, $E_p$ is a preassigned engineering tuning constant that is stored in a memory of processor XDCA. Another constant, start of continuous current, $I_{STARTC}$, at zero motor counter EMF voltage must be predetermined. Current is circulated through a stalled motor that has a zero ampere motor field excitation current. The current is slowly increased until the motor armature current is on the verge of continuous current. A measured value of this current, in per-unit of rated armature current, is used for $I_{STARTS}$. A value for peak AC line voltage $E_p$ to converter 27 is also determined by measurement and calculation as follows:

$$E_p(\text{per-unit}) = (\sqrt{2}) \times V_1/V_r; \quad \text{Eq. (12)}$$

where:

$V_1$ is measured RMS line-to-line voltage at converter 27.

$I_{STARTC}$ is also a preassigned engineering tuning constant that is stored in processor memory. Tuning adjustment 160 provides a preassigned value for $E_p$ (per-unit) between 1.0 and 2.0. Similarly, tuning adjustment 162 provides a preassigned value for $I_{STARTC}$ (per-unit) between 0.0 and 0.5.

In the exemplary embodiment of FIG. 5, equation 3, which provides the start of continuous current $I_{max}$, is simplified by allowing $\pi$ (3.14159) to be equal to 3.0. This results in an error of approximately 4.7%. The value of $I_{AVEM}$, which closely approximates equations 6 and 3, may simply be obtained from the equation:

$$I_{AVEM} \text{ (per-unit)} = \sqrt{[\{(E_p)^2 - (E_m)^2\}]} \times (I_{STARTC}/E_p). \quad \text{Eq. (13)}$$

In the exemplary embodiment, a look-up table for the approximated $I_{AVEM}$ is calculated, using the preassigned values of $E_p$ and $I_{STARTC}$, and stored in a table in XDCA memory. The table is a function of motor counter EMF $E_m$ and permits $E_m$ (per-unit) to vary from $-1.15$ to $+1.15$.

Whenever the absolute value of armature current $I_a$ is less than $I_{AVEM}$, software contact 148 passes sensed motor counter EMF $SE_m$ by either software contact 151 or 153 to summer 155. Whenever the forward thyristor banks are gated, software contact 151 is active and $E_m$ equals $SE_m$. Otherwise, when the reverse thyristor banks are gated, software contact 153 is active and $E_m$ equals $-SE_m$.

On the other hand, when armature current $I_a$ is continuous, software contact 148 is inactive, software contact 149 is active, and motor counter EMF $E_m$ is calculated as follows:

$$E_m(\text{per-unit}) = V_t - (I_a \times R_a). \quad \text{Eq. (14)}$$

Equation 14 is implemented by modules 145 and 147 of FIG. 5. Module 145 determines the product $I_a \times R_a$. Summer 147 completes the calculation of equation 14. Software contacts 151,153 and summer 155 operate in the same manner discussed previously, when the absolute value of armature current $I_a$ is less than $I_{AVEM}$, to generate the calculated value of $E_m$. Equation 13 is implemented by module 165 which calculates $I_{AVEM}$ as a function of calculated motor counter EMF $E_m$ and the tuning values $E_p$ and $I_{STARTC}$.

Limiter 158 limits the output gate angle $\alpha_2$ between 0 and $\pi/6$ radians (30°). This is based on a 30° gate angle at a motor stall condition and generally varies from a minimum of 27° at a maximum regenerative (inverting) counter EMF voltage to a maximum of 33° at a motoring (rectifying) counter EMF voltage. In the exemplary embodiment of FIG. 5, a reasonable approximation is a constant 30° at all counter EMF voltages. Thus, when the armature current reference $I_a^*$ is equal to $I_{AVEM}$, $\alpha_2$ is presumed equal to $\alpha_c$, the start of continuous current gate angle.

An absolute value of the armature current reference $I_a^*$ is determined by module 150. The absolute value of $I_a^*$ is limited between 0 and $I_{AVEM}$ by module 152. Module 154 implements a second look-up table function to implement equation 7a and provide a value of K. Module 156 calculates a value of $\alpha_2$ which is the product of K and $\alpha_c(\pi/6)$. This value, in turn, is limited by limiter 158 as previously discussed. Finally, $\alpha_2$ is utilized in a similar manner as previously discussed in FIG. 3 and the embodiment of FIG. 1A.

In the embodiment of FIG. 5, the current controller 62 (see FIG. 3) implements a third look-up table function which calculates an inverting gate angle end stop $\alpha_d$ as a function of motor counter EMF $E_m$ and the peak AC line voltage tuning constant $E_p$ (see equation 2). This look-up table provides $\alpha_d$ as a function of $E_m$. A fourth look-up table function calculates an inverting gate angle end stop $\alpha_i$ as a function of armature current $I_a$. To prevent thyristor converter inverting faults, the inverting end stop MAX$LIM is selected to be the smaller gate angle determined by motor counter EMF ($\alpha_d$) and armature current ($\alpha_i$). The current controller 62 uses inverting end stop $\alpha_d$ to preset an integrator output of the current controller after a thyristor bank reversal is made. By presetting the current controller output signal to the gate angle $\alpha_d$, armature current is zero. In this manner, the current controller provides bumpless transfers under bank reversal conditions.

Figure 6:
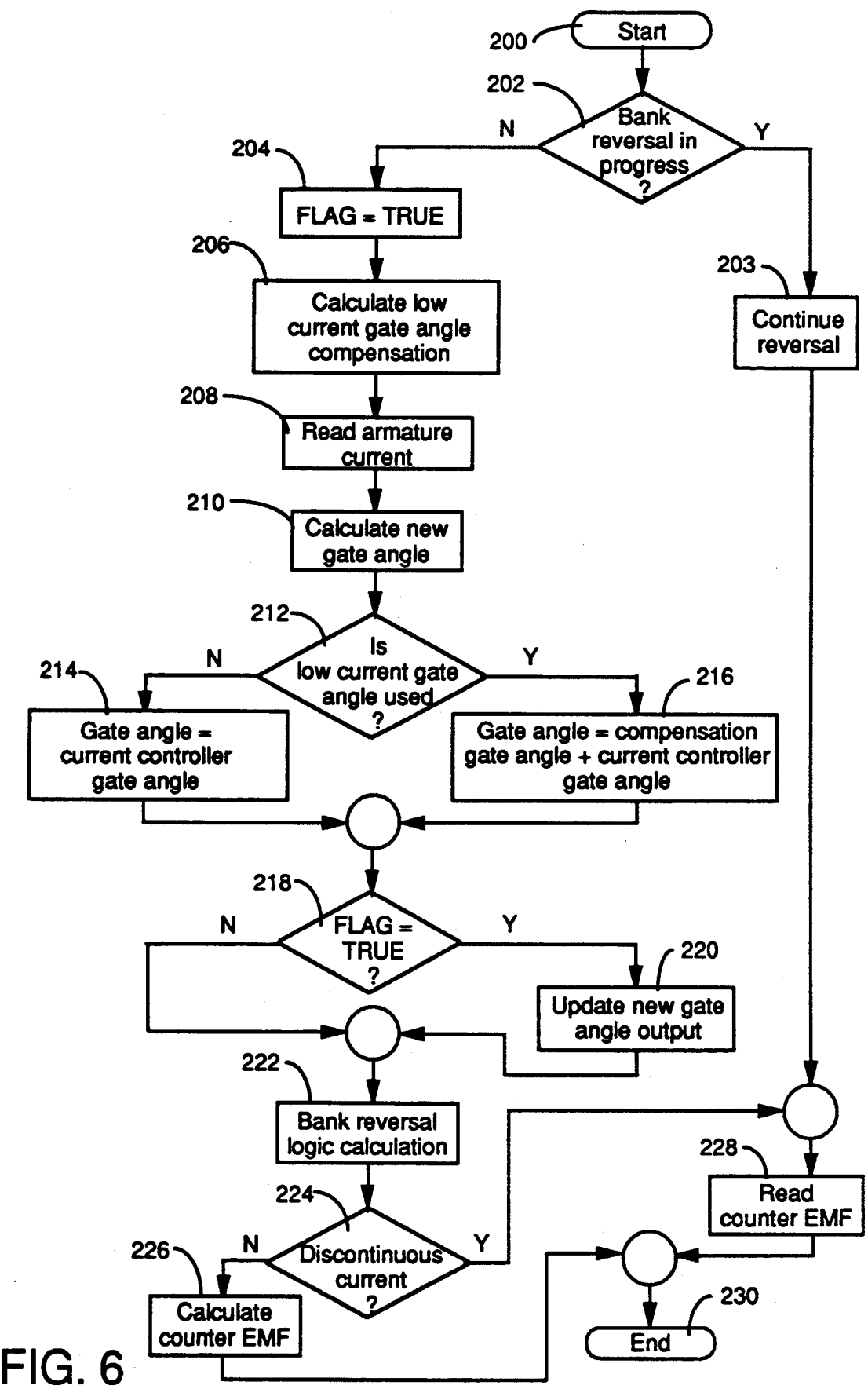
FIG. 6 is a flow chart of a processor interrupt subroutine, executed 30° after gating, for a low current compensation controller in accordance with the invention.

FIG. 6 is a flow chart of a processor interrupt subroutine for a low current compensation controller in accordance with the invention. The interrupt subroutine is entered at step 200 in response to an XDCA interrupt that occurs 30° after gating. If a bank reversal is determined to be in progress at step 202, then the subroutine continues to reverse the thyristor banks at step 203. Then, sensed counter EMF $SE_m$ is read at step 228 before the subroutine exits at step 230. Otherwise, if a bank reversal is not in progress, a logic permissive flag is set at step 204. Next, the low current gate angle compensation $\alpha_2$ is calculated at step 206 by low current controller 64 (see FIG. 3). Then, armature current $I_a$ is read at step 208. A new gate angle $\alpha_1$ is calculated by current controller 62 (see FIG. 3) at step 210. Step 212 uses logic signal OL$GATE$CTR (see FIG. 3) and determines whether the low current gate angle is utilized. If not, at step 214, the gate angle $\alpha$ is set equal to the current controller gate angle $\alpha_1$. If the low current angle is used, step 216 sets gate angle $\alpha$ equal to the low current compensation gate angle $\alpha_2$ plus the current controller gate angle $\alpha_1$. At step 218, the flag set in step 204 is checked. If the flag is not set, then it was reset by a subroutine executed 9° before gating (see FIG. 7). In this case, the gate angle is not output by this interrupt subroutine. On the other hand, if the flag is set, then the new gate angle is output to gating circuit 53 (see FIGS. 1 and 3) at step 220. Next, a bank reversal calculation is executed at step 222, based on the new gate angle. Step 224 determines whether there is discontinuous current. If not, motor counter EMF $E_m$ is calculated at step 226 before the subroutine exits at step 230. Otherwise, if current is discontinuous, sensed counter EMF $SE_m$ is read at step 228 before the subroutine exits.

Figure 7:
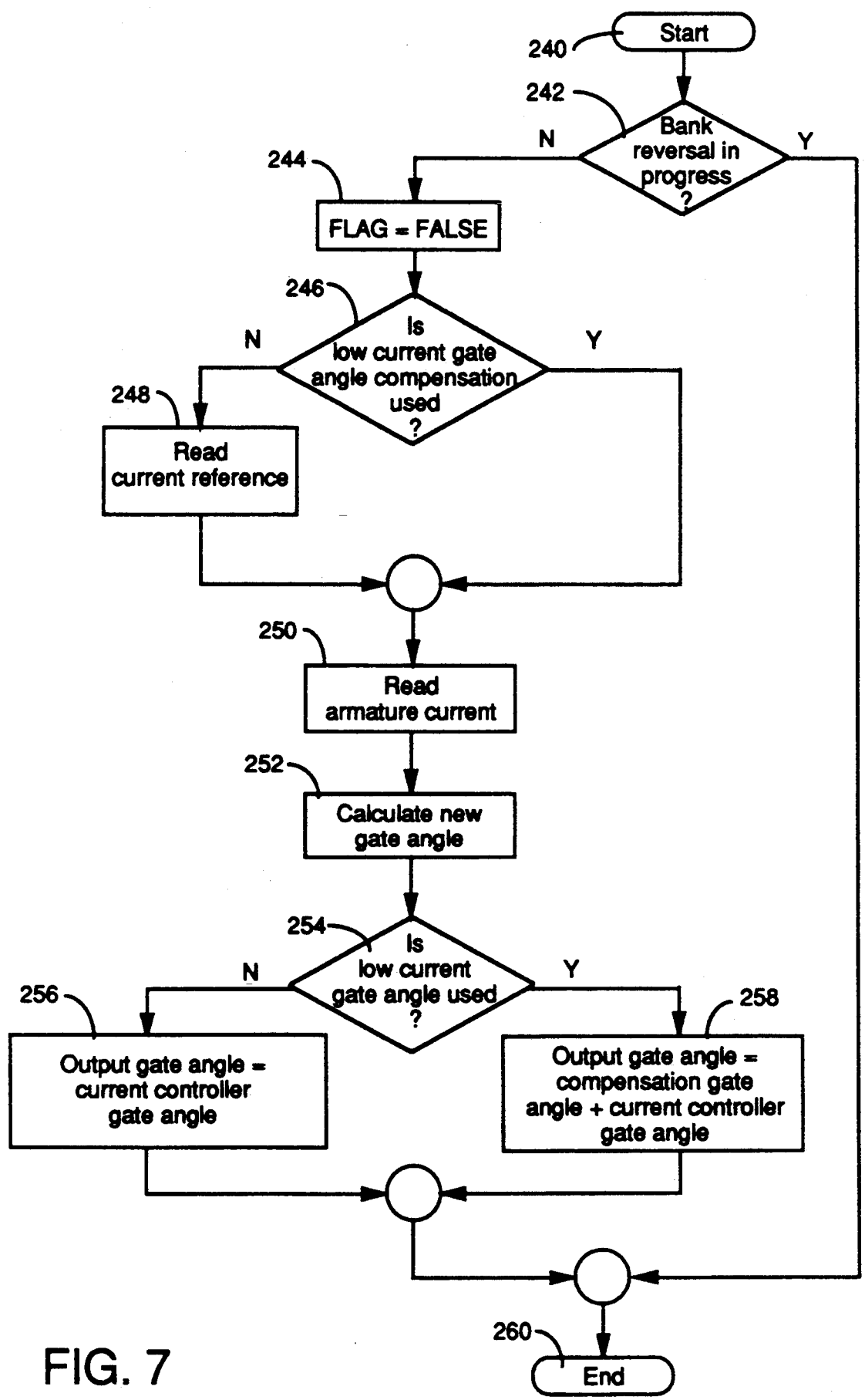
FIG. 7 is a flow chart of a processor interrupt subroutine, executed 9° before gating, for a low current compensation controller in accordance with the invention.

FIG. 7 is a flow chart of a second processor interrupt subroutine. The interrupt subroutine is entered at step 240 in response to an XDCA interrupt that occurs 9° before gating. If a bank reversal is determined to be in progress at step 242, then the subroutine exits at step 260. Otherwise, the logic permissive flag of FIG. 6 is reset at step 244. Next, step 246 determines whether low current gate angle compensation is used. If not, then the armature current reference $I_a^*$ is read at step 248. In either case, armature current $I_a$ is read at step 250. At step 252, the current controller 62 (see FIG. 3) calculates the gate angle $\alpha_1$ and limits the maximum change forward in gate angle to 5°. Step 254 uses logic signal OL$GATE$CTR (see FIG. 3) and determines whether the low current gate angle is utilized. If not, step 256 calculates gate angle $\alpha$ which equals the current controller gate angle $\alpha_1$. The gate angle $\alpha$ is then output to gating circuit 53 (see FIGS. 1 and 3). If the low current angle is used, step 258 calculates and outputs gate angle $\alpha$ which equals the low current compensation gate angle $\alpha_2$ (determined in FIG. 6, step 206) plus the current controller gate angle $\alpha_1$. Finally, the interrupt subroutine exits at step 260. This subroutine does not calculate the low current gate angle compensation. The flag utilized in FIGS. 6 and 7 ensures that only the gate angle calculated in the 9° before gating interrupt subroutine (FIG. 7) is output if that subroutine interrupted the 30° after gating interrupt subroutine (FIG. 6).

Further details regarding the interrupt subroutines of FIGS. 6 and 7 may be found in U.S. Pat. No. 4,982,145 issued Jan. 1, 1991 to Robert S. Peterson entitled "Method and Apparatus for the Optimization of Thyristor Power Supply Transport Time Delay" and assigned to the assignee of the present invention, which is herein incorporated by reference.

Figure 8:
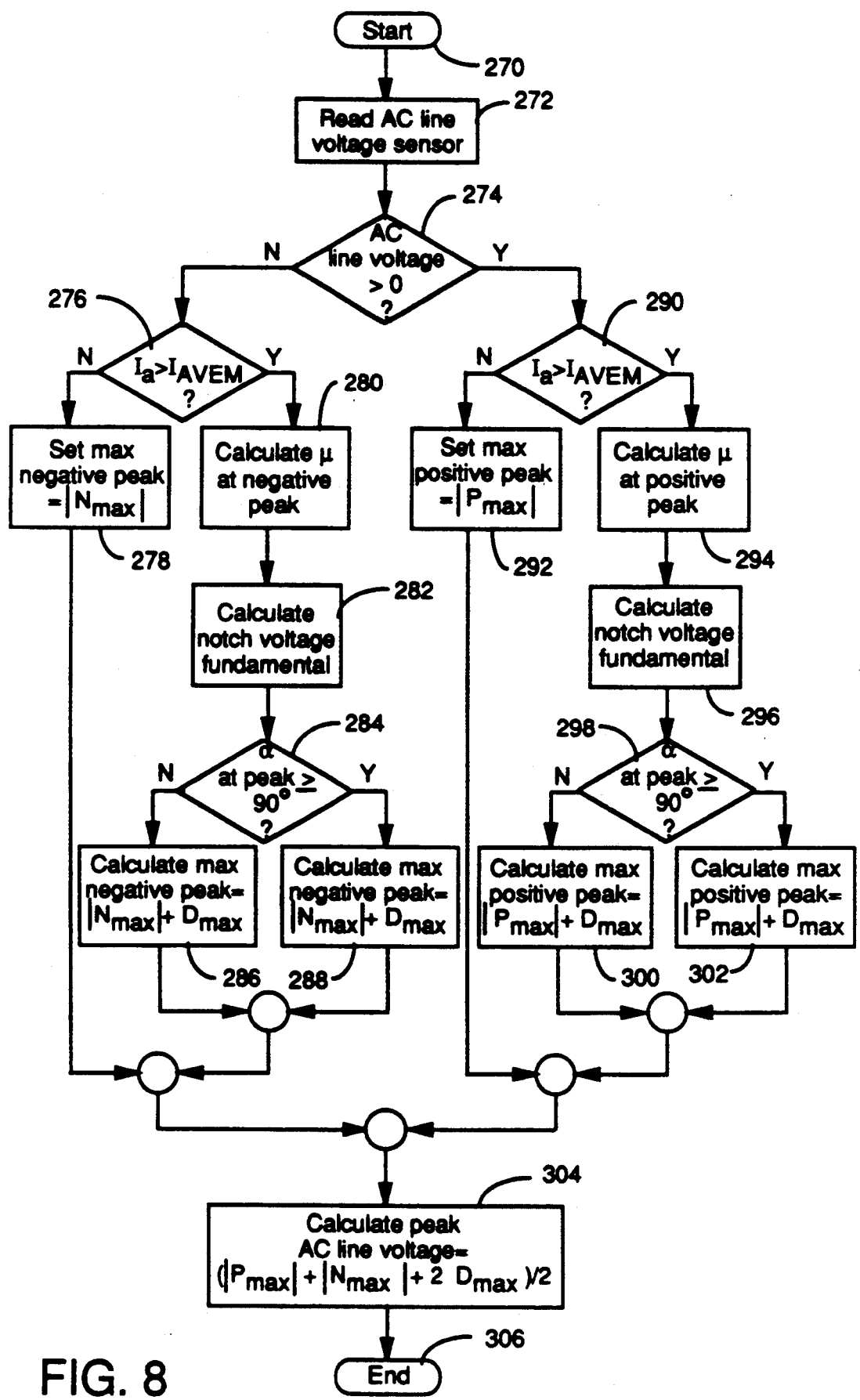
FIG. 8 is a flow chart of a processor subroutine, executed in response to a timing interrupt synchronized to an AC line voltage, for an a low current compensation controller in accordance with the embodiment of FIG. 1A.

FIG. 8 is a flow chart of a processor subroutine in accordance with the embodiment of FIG. 1A. The interrupt subroutine is entered at step 270 in response to an XDCA timing interrupt synchronized to an AC line voltage interrupt (see FIG. 2E). The peak AC voltage sensor 20 (see FIG. 1A) is read at step 272. If the voltage is positive, as determined at step 274, step 290 is executed. Otherwise, if the voltage is negative, step 276 is executed. Step 276 determines whether armature current is continuous or discontinuous. If the current is discontinuous, step 278 sets $N_{max}$ to the maximum positive absolute value determined in the negative AC line voltage sample array (see sample NP of FIG. 2E) and, also, sets $D_{max}$ to zero. Otherwise, if the current is continuous, then/x is calculated using equations 9b–9d at step 280 and the notch voltage wave fundamental peak voltage, $E_p \times (P.U.IND) \times (P.U.I.)$, is calculated at step 282. Step 284 determines whether the gate angle $\alpha$ is greater than or equal to 90°. If so, the maximum negative AC line peak considering commutation notching effects, $|N_{max}| + D_{max}$, is determined using equation 10a at step 288. Otherwise, when the gate angle $\alpha$ is less than 90°, the peak is determined using equation 10 at step806X286.

If the voltage is positive, as determined at step 274, step 290 is executed. Steps 300 and 302 generate a value, $|P_{max}| + D_{max}$, which is the maximum positive AC line peak considering commutation notching effects. Otherwise, operation of steps 290–302 is analogous to the operation of steps 276–288, as previously discussed. The average peak AC line voltage $E_p$ is calculated at step 304 using the results of steps 286,288 and steps 300,302. This average is equivalent to the result provided by equation 11. Finally, the subroutine exits at step 306.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A control system for controlling energization of a direct current (DC) motor from alternating current (AC) power, said control system comprising:
   first voltage sensing means sensing a peak voltage of said AC power;
   second voltage sensing means sensing a counter electromotive force (EMF) of said motor;
   current sensing means sensing an armature current of said motor, said armature current of said motor having during a first interval a discontinuous waveform and having during a second interval a continuous waveform;
   digital processor means comprising first current controller means for controlling at least the continuous waveform of said armature current, said first current controller means generating a first control signal in response to said sensed armature current and a current reference signal; second current controller means for controlling at least the discontinuous waveform of said armature current, said second current controller means generating a second control signal in response to said sensed peak voltage, said sensed counter EMF and said current reference signal; and means sequentially generating firing signals in response to said control signals; and
   converter means having a plurality of switches sequentially gating portions of half cycles of said AC power to said DC motor in response to said firing signals to provide DC power to said motor.

2. The control system of claim 1 wherein said first and second control signals control a gate angle of said firing signals.

3. The control system of claim 2 wherein said second voltage sensing means also senses a terminal voltage of said motor; wherein the continuous waveform has a continuous current; and wherein said digital processor means further comprises means for calculating a current value which occurs at a start of the continuous current, said current value being a function of said sensed peak voltage of said AC power and a calculated counter EMF of said motor, said calculated counter EMF of said motor is said sensed counter EMF of said motor when an absolute value of said sensed armature current is less than said current value, said calculated counter EMF of said motor is a function of said sensed terminal voltage of said motor when an absolute value of said sensed armature current is greater than said current value.

4. The control system of claim 3 wherein said digital processor means further comprises means for calculating said calculated counter EMF of said motor, when an absolute value of said sensed armature current is greater than said current value, as said sensed terminal voltage of said motor less a product of said sensed armature current and a resistance of an armature of said motor.

5. The control system of claim 3 wherein said digital processor means further comprises means for calculating a calculated peak voltage of said AC power as an average of an absolute value of a peak positive sensed voltage and an absolute value of a peak negative sensed voltage when an absolute value of said sensed armature current is less than said current value, and calculating said calculated peak voltage of said AC power as said average plus a commutation notch line voltage loss when an absolute value of said sensed armature current is greater than said current value.

6. The control system of claim 5 wherein said digital processor means further comprises means for calculating said commutation notch line voltage loss as a function of said control signals, said sensed armature current and said calculated peak voltage of said AC power.

7. The control system of claim 5 wherein said digital processor means further comprises means for calculating said commutation notch line voltage loss as a function of said control signals, said sensed armature current, said calculated peak voltage of said AC power, a frequency of said AC power and a constant representative of an AC system impedance.

8. The control system of claim 3 wherein the discontinuous waveform has a discontinuous current; wherein said second current controller means includes means for calculating a first gate angle value, which occurs at the start of the continuous current, and a second gate angle value, which occurs at a start of the discontinuous current, as a function of said sensed peak voltage of said AC power, said calculated counter EMF of said motor, said current value, and said current reference signal; and means for generating said second control signal as a function of said first and second gate angle values.

9. The control system of claim 2 wherein said second voltage sensing means also senses a terminal voltage of said motor; wherein the continuous waveform has a continuous current; and wherein said digital processor means further comprises means for calculating a current value which occurs at a start of the continuous current, said current value being a function of said sensed peak voltage of said AC power, said sensed counter EMF of said motor, a frequency of said AC power, and at least one constant representative of a resistance of an armature of said motor.

10. The control system of claim 2 wherein said digital processor means further comprises means for calculating a third control signal as a sum of said first and said second control signals, and wherein said means sequentially generating firing signals responds to said third control signal.

11. A control system for controlling energization of a direct current (DC) motor from alternating current (AC) power, said control system comprising:
  voltage sensing means sensing a counter electromotive force (EMF) of said motor;
  current sensing means sensing an armature current of said motor, said armature current of said motor having during a first interval a discontinuous waveform and having during a second interval a continuous waveform;
  digital processor means comprising first current controller means for controlling at least the continuous waveform of said armature current, said first current controller means generating a first control signal in response to said sensed armature current and a current reference signal; second current controller means for controlling at least the discontinuous waveform of said armature current, said second current controller means generating a second control signal in response to said sensed counter EMF and said current reference signal; and means sequentially generating firing signals in response to said control signals; and
  converter means having a plurality of switches sequentially gating portions of half cycles of said AC power to said DC motor in response to said firing signals to provide DC power to said motor.

12. The control system of claim 11 wherein said first and second control signals control a gate angle of said firing signals.

13. The control system of claim 12 wherein said voltage sensing means further senses a terminal voltage of said motor; wherein the continuous waveform has a continuous current; and wherein said digital processor means further comprises means for calculating a first current value which occurs at a start of the continuous current, said first current value being a function of a calculated counter EMF of said motor and constants representative of a peak voltage of said AC power and a second current value which occurs at a start of the continuous current at a motor counter EMF having a zero value, said calculated counter EMF of said motor is said sensed counter EMF of said motor when an absolute value of said sensed armature current is less than said first current value, said calculated counter EMF of said motor is a function of said sensed terminal voltage of said motor when an absolute value of said sensed armature current is greater than said first current value.

14. The control system of claim 13 wherein said digital processor means further comprises means for calculating said calculated counter EMF of said motor, when an absolute value of said sensed armature current is greater than said first current value, as said sensed terminal voltage of said motor less a product of said sensed armature current and a resistance of an armature of said motor.

15. The control system of claim 13 wherein said second current controller means further includes means for generating second control signal as a function of said current reference signal and said first current value.

16. The control system of claim 12 wherein said digital processor means further comprises means for calculating a third control signal as a sum of said first and said second control signals, and wherein said means sequentially generating firing signals responds to said third control signal.

17. An apparatus for detecting discontinuous armature current for use in a control system controlling energization of a direct current (DC) motor from alternating current (AC) power, said control system having means sequentially generating firing signals, means controlling a gate angle of said firing signals, and converter means having a plurality of switches sequentially gating portions of half cycles of said AC power to said DC motor in response to said firing signals to provide DC power to said motor, said apparatus comprising:
  first voltage sensing means sensing a peak voltage of said AC power;
  second voltage sensing means sensing a counter electromotive force (EMF) of said motor;
  current sensing means sensing an armature current of said motor, said armature current having during a first interval a discontinuous waveform and having during a second interval a continuous waveform with a continuous current; and
  digital processor means comprising means for calculating a current value which occurs at a start of the continuous current, said current value being a function of said sensed peak voltage of said AC power and said sensed counter EMF of said motor; and means comparing said sensed armature current with said current value, in order to detect the discontinuous waveform.

18. The apparatus of claim 17 wherein said second voltage sensing means further senses a terminal voltage of said motor; wherein said digital processor means further comprises means for calculating a calculated counter EMF of said motor; and wherein said means for calculating said current value calculates said current value as a function of said sensed peak voltage of said AC power and said calculated counter EMF of said motor, said calculated counter EMF of said motor is said sensed counter EMF of said motor when an absolute value of said sensed armature current is less than said current value, said calculated counter EMF of said motor is a function of said sensed terminal voltage of said motor when an absolute value of said sensed armature current is greater than said current value.

19. The apparatus of claim 18 wherein said digital processor means further comprises means for calculating a calculated peak voltage of said AC power as an average of an absolute value of a peak positive sensed voltage and an absolute value of a peak negative sensed voltage when an absolute value of said sensed armature current is less than said current value, and means for calculating said calculated peak voltage of said AC power as said average plus a commutation notch line voltage loss when an absolute value of said sensed armature current is greater than said current value.

20. The apparatus of claim 19 wherein said first voltage sensing means has filter means filtering and attenuating said sensed peak voltage of said AC power, and wherein said digital processor means further comprises means for correcting said calculated peak voltage of said AC power for the attenuation of said filter means.

* * * * *